United States Patent [19]
Pech

[11] 3,937,487
[45] Feb. 10, 1976

[54] TENSIONING DEVICE FOR USE PARTICULARLY WITH VEHICLE SAFETY BELTS

[75] Inventor: Bernard M. Pech, Paris, France

[73] Assignee: Societe Nationale des Poudres et Explosifs, France

[22] Filed: Jan. 7, 1975

[21] Appl. No.: 539,049

[52] U.S. Cl. .................... 280/150 SB; 280/150 B
[51] Int. Cl.² ..................................... B60R 21/10
[58] Field of Search ............ 280/150 SB; 180/82 C; 188/1 C

[56] References Cited
UNITED STATES PATENTS

| | | | |
|---|---|---|---|
| 3,871,470 | 3/1975 | Schwanz | 280/150 SB |
| 3,871,683 | 3/1975 | Otani | 280/150 SB |

Primary Examiner—Robert R. Song
Attorney, Agent, or Firm—Bucknam and Archer

[57] ABSTRACT

A tensioning device which also provides for damped return movement, such as for use in tensioning a vehicle safety belt comprises a casing, a main piston movable within the casing by high pressure gases issuing from a pyrotechnic charge, a rod firmly attached to the piston and carrying an attachment buckle for the belt, and a piston jamming mechanism for preventing movement of the piston in one direction but allowing damped movement thereof in the opposite direction. The jamming mechanism is actuated in response to displacement of an auxiliary piston included in the main piston structure away from its initial position where it is held by a frangible element designed to break when the pressure of the combustion gases exceeds a particular level. The main piston preferably works in an outer piston which is slidable in the casing and also provided with a jamming mechanism whereby two phases of damping are provided for.

10 Claims, 8 Drawing Figures

TENSIONING DEVICE FOR USE PARTICULARLY WITH VEHICLE SAFETY BELTS

This invention relates to a linear mechanical tensioning device particularly, but not exclusively for use with safety belts installed in vehicles capable of travelling at high speeds, such as motor cars.

Numerous protection devices are known for ensuring the safety of people travelling in vehicles, and possibly the most effective protection is achieved by the systems employing inflatable cushions which are blown up by a very rapid supply of gas at high pressure with the damping of the person to be protected being achieved by expelling these gases into the passenger compartment of the vehicle, the cushion undergoing deformation due to the pressure of the said person and thus providing a large surface area of contact which prevents any localisation of force on the chest of the person being protected. The effectiveness of the protection provided by a simple safety belt is very poor because the person, thrown forwards by his own inertia, is held back only by two straps fixed rigidly to the chassis of the vehicle, and this provides only a restricted surface area of contact with a person and subjects the said person to a very high pressure due to the absence of damping. Some safety belts are equipped with devices which permit some discontinuous damping, for example by forming folds on the belt, the fastenings of the said folds rupturing and allowing the belt to unfold. Another disadvantage of safety belts resides in the fact that they require an initial adjustment to be made every time a different person uses the belt, and that they hinder the movements of the person wearing the strap. However, tensioning devices, like that described in French Patent Application No. 72/21,927 make it possible for the person to be protected to move freely, the belt coming into close contact with the person only at the instant of a collision irrespective of the initial adjustment of the belt. Since safety belts do not allow for effective damping, the known protection systems use a combination of such a belt with a mobile seat mounted on rails firmly fixed to the floor of the vehicle, a damping component, for example a hydraulic damper, making it possible for the seat to shift its position by a limited amount, and absorbing a large amount of energy to achieve effective damping.

In accordance with the present invention there is provided a tensioning device such as for use in tensioning a vehicle safety belt comprising a casing, a first piston axially movable in a cylinder defined within the casing, which piston is firmly fixed to an axially extending rod having means for attaching an element to be tensioned, means for supplying gas at high pressure to an expansion chamber defined between the first piston and a front end wall of the cylinder, whereby in use, the said gases cause the piston to travel in a first direction along the cylinder and exert a tensioning force on an element attached to the rod, an auxiliary piston included in the first piston structure and held in an initial position by a frangible element adapted to fracture when the pressure in the expansion chamber reaches a predetermined value, the pressure prevailing in the expansion chamber being communicated to the auxiliary piston via at least one permanently open passage way, and piston stopping means actuated in response to displacement of the auxiliary piston away from the initial position following fracture of the frangible element, to prevent movement of the first piston relative to the cylinder in the said first direction, but allow movement of the first piston relative to the cylinder in the opposite direction.

With such a tensioning device it is possible to achieve total damping of a person to be protected by dissipating a large amount of energy comparable to the energy dissipated by an inflatable cushion or by damping component on rails, and at the same time only put a safety belt in contact with the person to be protected when a collision takes place.

The tensioning device according to the present invention may serve as a component linking a safety belt to a fixed element of a chassis of the passenger compartment of a vehicle; for example, in the case of seat belts for protecting people sitting in the front of a motor car, it can be situated between the two seats and can form one of the three points of attachment of the belt of the strap.

In a preferred embodiment the piston stopping means comprises a jamming mechanism including a support surface, a plurality of elements in contact with the support surface and positioned between a portion of the first piston having a conical bearing surface and the inner surface of the cylinder, and an elastic retaining component for holding the elements in a position which permits free movement of the piston relative to the cylinder, the support surface being movable by the displacement of the auxiliary piston to jam the elements between the conical bearing surface and the inner surface of the cylinder to prevent movement of the first piston relative to the cylinder in said one direction.

The auxiliary piston may be positioned axially inside the first piston, the said auxiliary piston possessing two axially adjacent cylindrical parts of different diameters defining a radial shoulder which is subjected to the pressure of the gases in the expansion chamber via at least one permanently open orifice.

Alternatively, the auxiliary piston may be annular and positioned at the periphery of the first piston with the auxiliary piston being subjected to the pressure of the gases in the expansion chamber via at least one permanently open orifice.

The frangible element may be an integral part of the auxiliary piston which is split in two when the element fractures, with one portion of the fractured auxiliary piston actuating the piston stopping means.

The frangible element may alternatively be a separate member with movement of the entire auxiliary piston actuating the piston stopping means when the member fractures.

The means for supplying gas to the expansion chamber preferably comprises at least one annular pyrotechnic charge with a surface area of combustion which increases during combustion, and an ignition system therefore comprising a gas-free powder.

In a preferred embodiment the cylinder in which the first piston travels is provided by an outer piston itself slidable in the casing, the outer surface of the outer piston partially defining a first damping chamber, the outer piston including means for preventing movement of the outer piston relative to the casing in one direction of relative axial movement between the two, which direction corresponds to return movement of the outer piston to an initial position.

Additional pistons could be provided between the first piston and the casing to allow for additional damp- Some embodiments of the invention for use with vehicle safety belts are described below by way of example with reference to the accompanying drawings, in which.

Figure 1:
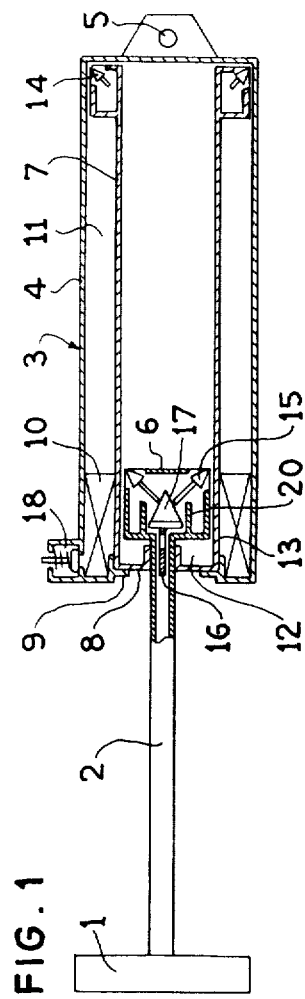
FIG. 1 is a diagrammatic cross-section of an entire tensioning device produced in accordance with a first construction and represented in an initial position.
Figure 2:
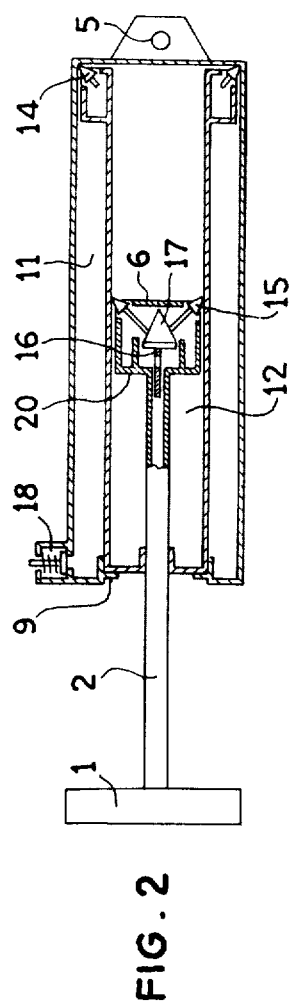
FIG. 2 is a longitudinal cross-section through the device of FIG. 1, shown during a first damping phase.

The tensioning device shown in FIGS. 1 and 2 comprises a buckle for attaching a belt, fixed to an axial rod 2 and a body 3, a casing 4 of which is, in use, firmly pivotally fixed to the chassis of a vehicle by an attachment plate 5. A first central piston 6 is firmly fixed to the rod 2 and is slidable in a cylinder defined by an outer piston 7 which is slidable within the casing 4. In the initial position, before actuation of the device, the central piston 6 is in contact with a front end 8 of the outer piston 7 which is held inside the casing 4 by a frangible retaining component 9. A pyrotechnic charge 10 for generating gases at high pressure is located in a damping chamber 11 which communicates with an expansion chamber 12 via openings 13. The outer piston is equipped with a component 14 for preventing relative movement between the outer piston and casing in one direction of travel of the piston 7. The component 14 is permanently in working condition and is arranged to prevent any backwards movement of the piston 7 (i.e. to the right as seen in FIG. 1 towards its initial position shown in FIG. 1, after the outer piston has travelled forwards to the left. The central piston has a component 15 for preventing relative movement between the central and outer pistons in one direction of travel of the central piston. A jamming mechanism of this component 15 is in a non-jamming condition in the initial position of piston 6, as shown in FIG. 1, and during initial displacement of the central piston backwards into the body which occurs when the pyrotechnic charge 10 is fired. The jamming mechanism is actuated when the pressure prevailing in the expansion chamber 11 reaches a predetermined value. At the predetermined pressure a frangible element 16 ruptures to allow an auxiliary piston 17 to shift and actuate the jamming mechanism to prevent travel of the central piston 6 backwards relative to piston 7, but at the same time allow the piston to move relative to the outer piston towards its initial position. A mechanical pressure-limiting device is provided on the casing 4 in the form of an external valve 18.

Figure 3:
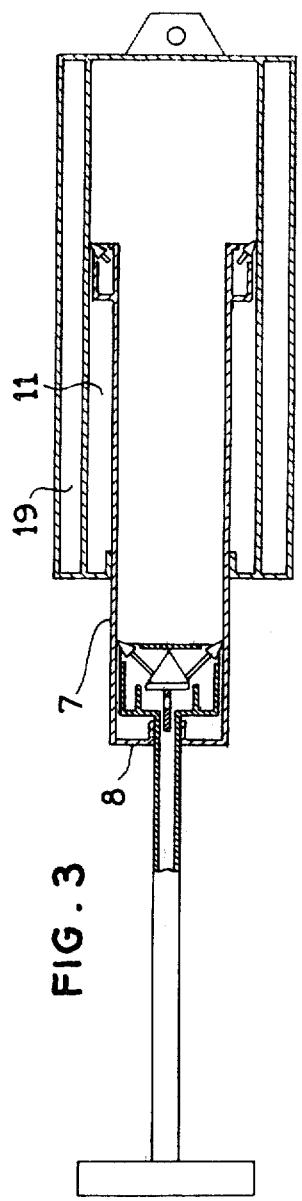
FIG. 3 is a diagrammatic cross-section of an entire tensioning device of an alternative construction and represented during a second damping phase.

The embodiment illustrated in FIG. 3 is of the same construction as that of FIGS. 1 and 2 except that a residual compression chamber 19 is provided instead of a valve for limiting the pressure.

In the initial position (FIG. 1), the tensioning device has a length determined by the length of the casing 4 and the length of the attachment rod 2; the preferential jamming component 15 of the central piston 6 is not in an operating condition and the central piston can travel freely whilst the outer piston 7 is retained in the position shown by the frangible component 9 which may be, for example, an elastic ring with lugs. When a person to be protected puts on their safety belt, no adjustment is necessary and the belt is not in close contact with the said person, thus leaving him free to move. When a collision occurs, an electrical signal generated by an impact detector fires the pyrotechnic charge 10 which liberates a large volume of gas within a very short period of time. The gases at high pressure generated by the pyrotechnic charge which has a surface area of combustion which increases during combustion propel the central piston 6 backwards, and thus reduce the length of the device (the casing being firmly fixed to the chassis of the vehicle) to tighten the safety belt and bring it into close contact with the person to be protected. This will normally occur before the piston 6 reaches the end of its path, the position of the central piston 6 at the moment of contact being determined by the initial slack in the safety belt. The person thrown violently forwards by his own inertia as a result of the collision, exerts a large resisting force on the central piston and the backwards displacement of the piston slowed down or stopped. This limits the volume of the expansion chamber 12 and causes the pressure of the combustion gases to increase. When the pressure in the expansion chamber 12 reaches the predetermined limiting value, the auxiliary piston 17 which is subjected to the full pressure of the gases via passageways 20, ruptures the frangible element 16 and moves relative to the piston 6 to actuate the component 15 and thus prevent any further movement of the piston 6 backwards. The component 15 allows the piston 6 to travel forwards, to the left as seen in the drawings, in order to effect a first damping phase (FIG. 2) which continues until the central piston 6 has returned to its initial position in contact with the front end 8 of the outer piston 7. A second damping phase commences with the fracture of the frangible elastic ring 9 which liberates the outer piston 7 which can then, under the effect of the force exerted on the belt by the person to be protected, travel forwards relative to the casing 4, compressing the gases at high pressure present in the daming chamber 11 as it moves. The consequential rise in pressure of the gases is limited by the calibrated valve 18 or in the FIG. 3 embodiment, by the residual compression chamber 19.

Figure 4:
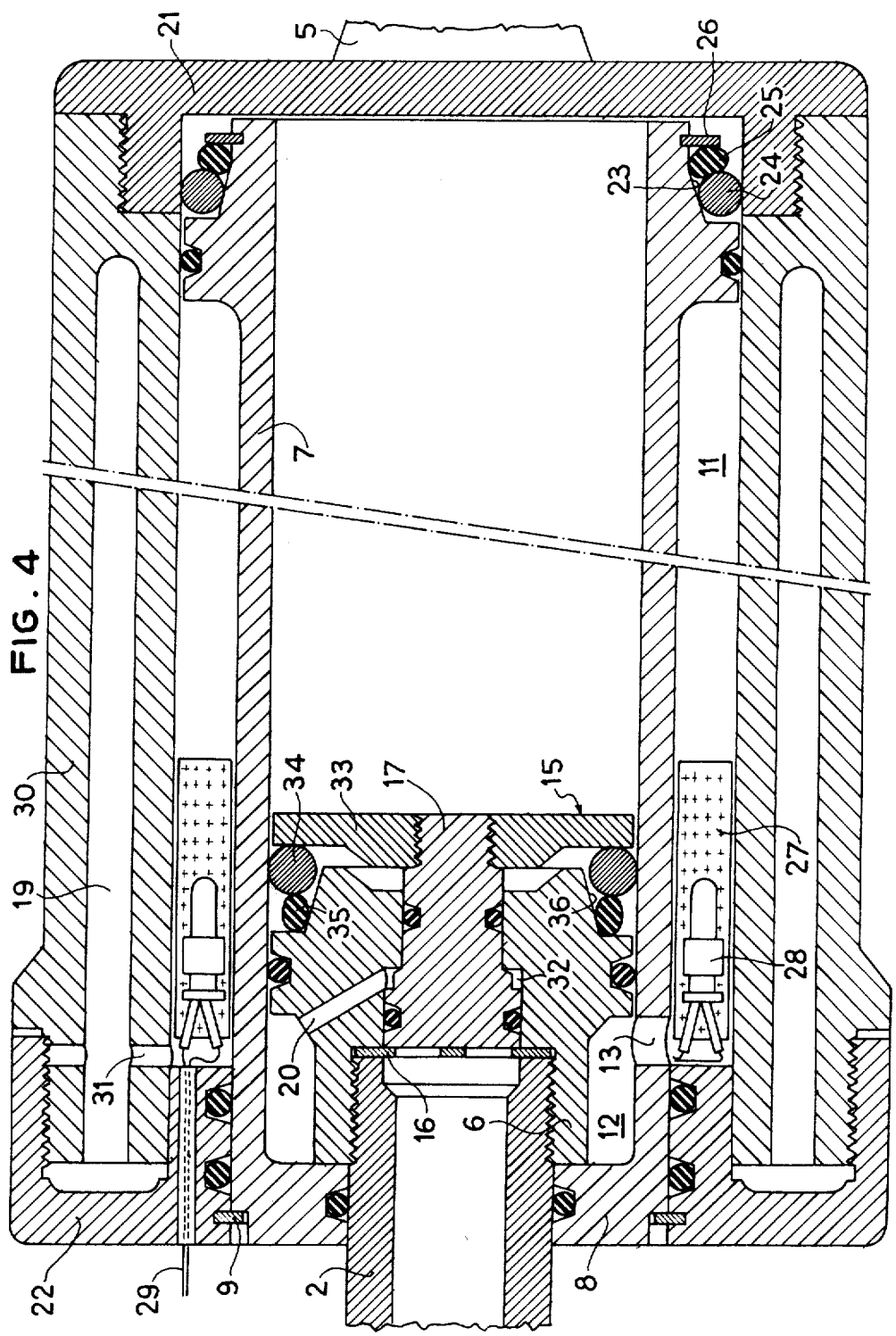
FIG. 4 is a detailed longitudinal cross-section of a tensioning device in an initial position.

The tensioning device shown in FIG. 4 is of the general construction illustrated diagrammatically in FIG. 3. The body comprises a casing 30 having an annular cavity forming the residual compression chamber 19, and onto which there is screwed, firstly, a rear plate 21 equipped with a member 5 for pivotally attaching the device to a vehicle chassis, and secondly, a front plate 22 equipped with a frangible retaining component 9 which is in the form of a ring carrying lugs which engage the outer piston 7 and are adapted to shear. The outer piston possesses, in its rear portion, a component for preventing rightward movement of the piston relative to the casing and consisting of a conical bearing surface 23 and a number of balls 24 maintained in contact with the conical bearing surface by means of an elastic ring 25 which is held compressed by a support ring 26. The outer surface of the outer piston and the inner surface of the casing delimit the damping chamber 11 which contains, in its front portion, an annular pyrotechnic charge consisting of a main charge 27 produced from powder cylinders containing a multiplicity of perforations, and two rapid ignition devices 28, the firing wires 29 for which pass through the front plate 22 of the casing via a sealed passage. The front end 8 of the outer piston is in sealing contact with the rod 2 which can slide freely therethrough, and with the central piston 6. The piston 6 includes a component which may be actuated to prevent rightward movement of piston 6 relative to the outer piston, including an auxiliary piston 17 and a jamming mechanism similar to that of the outer piston. Orifices of small cross-section 31 connect the residual compression chamber 19 to the damping chamber 11, whilst openings of large cross-section 13 connect the latter chamber to the expansion chamber 12 and passageways 20 connect this expansion chamber to an annular surface 32 on the auxiliary piston 17.

The casing may, for example, have an external diameter at the rear portion, 75 mm, and overall length, 250 mm. The first value gives an indication of the scale of representation and will give a general idea of the size of the device. The main pyrotechnic charge 27 possesses an ignition lag of 4 milliseconds and a duration of combustion of 15 milliseconds, and the pressure of the gases reaches approximately 80 kg/cm$^2$ at the end of the combustion phase, the central piston 6 being considered in contact with the rear plate 21 of the outer casing. The active surface areas of the central piston 6 and of the outer piston are 8 cm$^2$ and all the seals are resistant to high temperatures.

During operation, after the pyrotechnic charge has been fired from an electrical signal transmitted through the wires 29, the pressure increases very rapidly but smoothly and the increase is more rapid in the expansion chamber 12 than in the residual compression chamber by virtue of the relative sizes of aperatures 13 and 31. This brief local excess pressure makes it possible to displace the piston 6 and the rod 2 backwards more rapidly, the frangible retaining component 9 preventing any premature displacement of the outer piston 7. The central piston, propelled backwards, causes the safety belt to tighten. When the straps of the belt come into contact with the person to be protected the pressure of the gases increases more rapidly since movement of the piston 6 is opposed, and when this pressure reaches a pre-determined value the jamming component is actuated. This predetermined pressure can be set, for example, at 80 kg/cm$^2$ and as soon as this limit is reached the pressure which is exerted on the annular surface 32 of the auxiliary axial piston 17 via the passageways 20 causes the lugs of the frangible element 16 to fracture and the auxiliary piston 17 to move forwards. The piston 17 carries a disc 33, the peripheral zone of which pushes a collection of balls 34 forwards, compressing the elastic ring 35, to jam these balls between the conical bearing surface 36 of the piston 6 and the inner surface of the outer piston 7. Operation of this jamming mechanism stops backwards displacement of the piston and only allows the forward displacement when the force exerted on the safety belt by the person to be protected is sufficient to overcome the force exerted on the piston 6 by the pressure of the combustion gases. This return movement of the piston towards its initial position leads to compression of the gases owing to a decrease in the volume of the expansion chamber, and the damping of the person to be protected is thus effected by using a belt retaining force which increases gradually. The outer piston 7 is still held by the ring 9 and, since the initial damping phase takes place within a very short period of time, heat exchanges with the external medium are limited, and the compression of the gases is close to an adiabatic change. During return movement of the piston 6, the gases are forced back through the apertures 13 into the damping chamber 11 and when the front face of the central piston engages with the front end 8 of the outer piston, damping becomes discontinuous since the force applied to the attachment buckle by the safety belt must increase to shear off the lugs of the ring 9 and free the outer piston for forward movement. This forward movement of piston 7 compresses the gases essentially adiabatically driving them back into the residual compression chamber 19 via orifices 31. Any return movement backwards of the outer piston when the damping of the person to be protected is complete, is prevented by the balls 24 jamming between the conical surface 25 and the inner surface of the casing.

Figure 5:
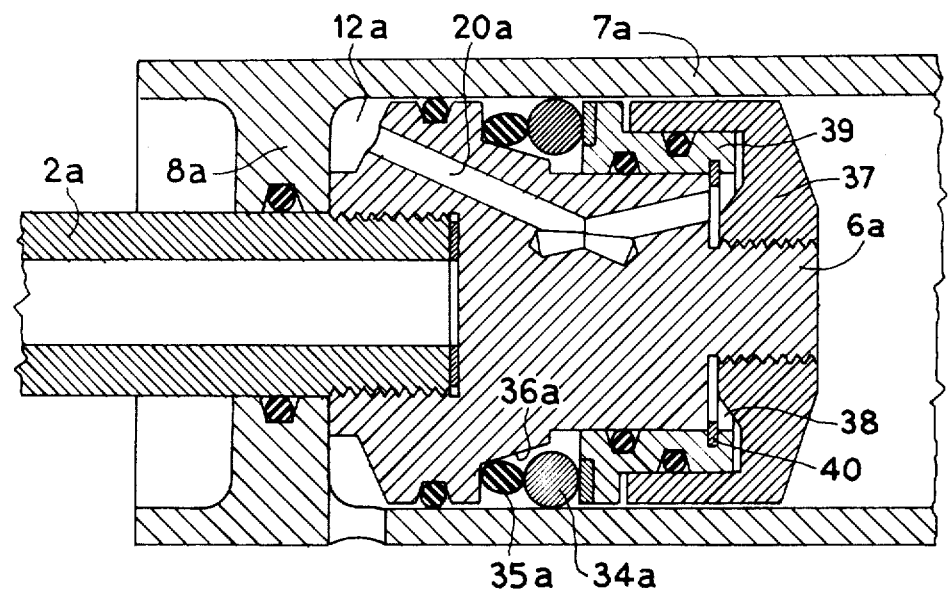
FIG. 5 is a detailed longitudinal cross-section illustrating a central piston of alternative construction.

The embodiment of FIG. 5 includes an outer piston 7a through the front end 8a of which sealingly extends a rod 2a to which is screwed a central piston 6a having an annular member 37 delimiting an inner annular chamber 38 which communicates with an expansion chamber 12a via three passageways 20a (only one shown). The inner chamber 38 contains an auxiliary annular piston 39 which is held in position by lugs on a ring 40 and which is in contact with a collection of balls 34a which are urged against the annular piston by an elastic ring 35a which thereby prevents these balls from jamming between a conical bearing surface 36a of the central piston 6a and the inner surface of the outer piston 7a as long as the lugs of ring 40 are not fractured, as wll occur when the pressure in the expansion chamber exceeds a predetermined value. The operation and undescribed constructional features of this embodiment are the same as in the earlier embodiments described above.

Figure 6:
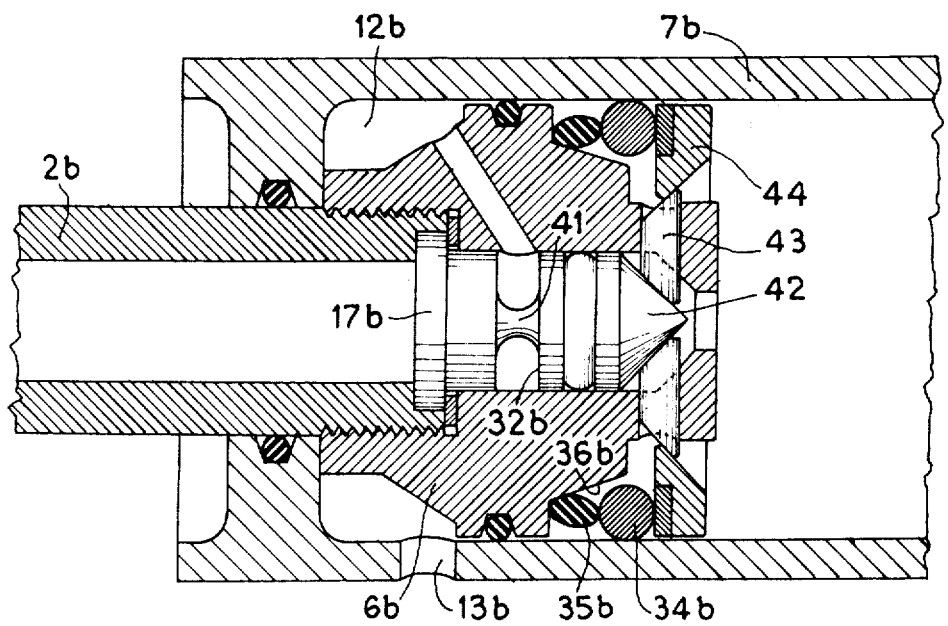
FIG. 6 is a detailed longitudinal cross-section illustrating a central piston of another construction.

The tensioning device shown in FIG. 6 has a construction that will be readily understood from the following description of its operation. In the event of a collision, an electrical signal generated by an impact detector is transmitted to a pyrotechnic charge which generates gas or to a pyrotechnic charge which liberates a gas which is initially compressed, for example in the residual compression chamber. This gas at high pressure is conveyed into an expansion chamber 12b via aperatures 13b and the central piston 6b is propelled backwards and causes tightening of a safety belt attached to rod 2b. When the straps of the belt come into close contact with a person to be protected the pressure of the gases increases rapidly, and when this pressure reaches a predetermined value, for example, 80 kg/cm$^2$, the force acting on annular surface 32b of an auxiliary piston 17b induces a tensile stress in frangible element 41, which is sufficient to cause the element to fracture. A rear portion 42 of the piston 6b, which has a conical end, is displaced backwards by the gas pressure and forces four control rods 43 out laterally. The rods 43 have tapering ends which cooperate with an annular element 44 to move the element forwards when the rods are moved outwards, to cause a collection of balls 34b to jam between a conical bearing surface 36b on the central piston 6b and the inner surface of the outer piston 7b, and elastic ring 35b being coming.

pressed.

In all the tensioning devices described above, it is to be noted that when the central piston returns towards its initial position during the first phase of damping the person to be protected, the damping is due, on the one hand, to the work involved in compressing the combustion gases and, on the other hand, to the work involved in deforming the inner surface of the outer piston, since the balls tend to penetrate into this surface by pressing against the conical bearing surface of the central piston, this penetration being produced by the thrust either of an auxiliary piston as in FIG. 5 or of a mobile element driven by the auxiliary piston as in FIGS. 4 and 6. The damping due to this deformation can represent a large fraction of the total damping when the auxiliary piston has a large surface area subjected to the pressure of the gases.

Figure 7:
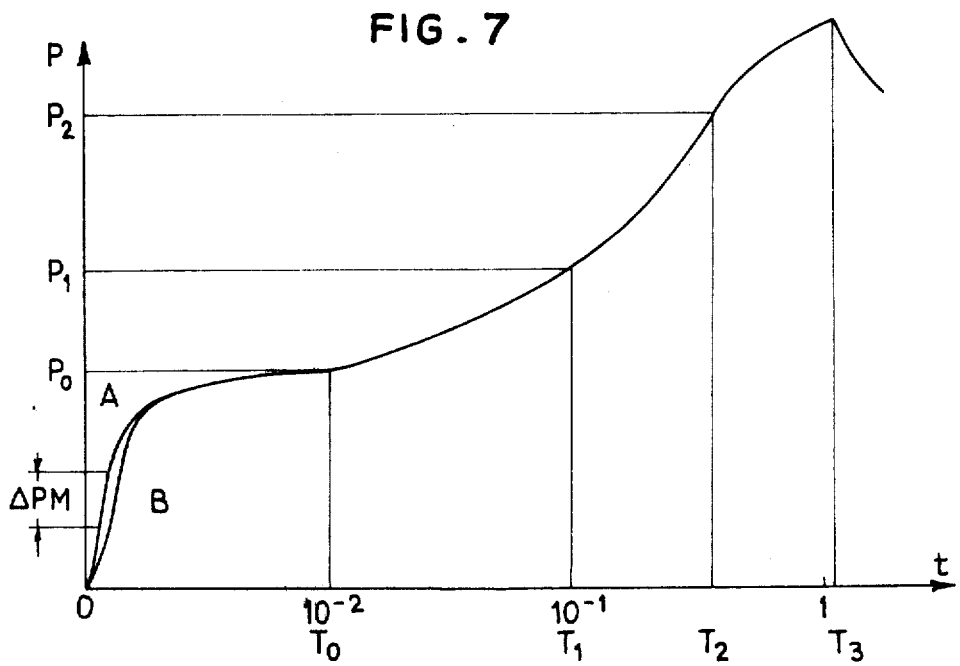
FIG. 7 is a diagram representing the change in the pressure of the gases as a function of time.
Figure 8:
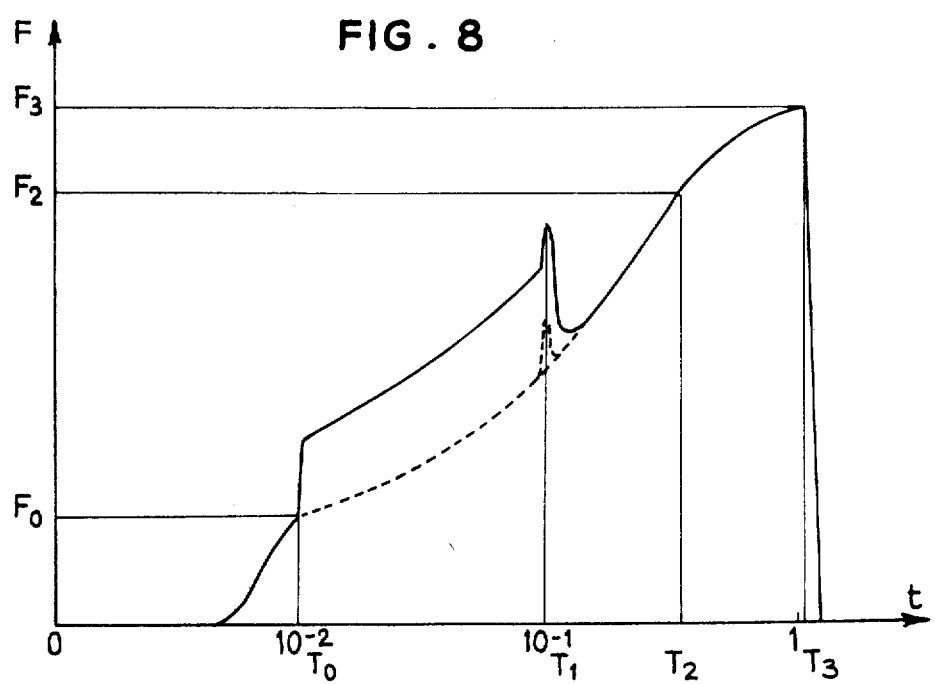
FIG. 8 is a diagram representing the change in the resisting force exerted on the belt, as a function of time, for a device constructed according to FIG. 6.

In FIGS. 7 and 8, which give respectively the pressure and the resisting force exerted on the belt, as a function of time, the origins O correspond to the instant of firing the ignition powder, the instants $T_o$ correspond to the actuation of the jamming mechanism of the central piston, the instants $T_1$ correspond to the central piston arriving at its initial position after the first damping phase and the instants $T_3$ correspond to the end of the damping process. The indices of the particular values $P_n$ and $F_n$ indicated on the ordinates correspond to the indices of the time instants considered. The ordinates P (pressure) and F (force) are on a linear scale whilst the scale of time on the abscissae are logarithmic, the correspondence of the instants $T_n$ with the time base being only exemplary and depending essentially on the collision conditions which determined various conditions of operation. FIGS. 7 and 8 show the way in which the pressure and the resisting force change in a device produced in accordance with the example of FIG. 6, all the other components being identical to those of FIG. 4. In FIG. 7, the portion of curve A corresponds to the pressure which prevails in the damping chamber and the portion of curve B represents the pressure in the expansion chamber, the maximum difference $\Delta P_M$ determining the strengths of the frangible retaining elements such as the rings with lugs, which hold the outer piston during the initial displacement of the central piston backwards. In FIG. 8, the curve in a full line represents the way in which the force resisting slackening of belt due to the work done in compressing the gases and to the work done in deformation during damping changes, and the curve drawn in a broken line illustrates the way in which the resisting force due solely to the work done in compressing the gases changes. The sharp rise occurring at the instant $T_1$ is due to the additional force required to shear the lugs of the frangible retaining element.

I claim:

1. A tensioning device for use in tensioning an element, such as a vehicle safety belt, comprising a casing, a cylinder having front and rear ends defined within said casing, a first piston axially movable within said cylinder, a rod firmly fixed to said first piston and having means for attaching said element to be tensioned, an expansion chamber defined between said first piston and said front end of said cylinder, means for supplying gas at high pressure to said expansion chamber to move said first piston in a first direction along said cylinder and exert a tensioning force on the element attached to said rod, an auxiliary piston included in the first piston structure, a frangible element for holding said auxiliary piston in an initial position and adapted to fracture when the pressure in said expansion chamber reaches a predetermined level, permanently open passage means communicating the pressure in said expansion chamber to said auxiliary piston, and piston stopping means actuated in response to displacement of said auxiliary piston away from said initial position following fracture of said frangible element, to prevent movement of said first piston relative to said cylinder in the said first axial direction, but allow movement of said first piston relative to said cylinder in the opposite direction.

2. A device as claimed in claim 1 wherein said first piston has a conical bearing surface on said piston stopping means comprises a jamming mechanism including a support surface, a plurality of elements positioned between said bearing surface and the inner surface of said cylinder and in contact with said support surface, and elastic retaining means for holding said elements in a position which permits free axial movement of said first piston relative to said cylinder, said support surface being movable by said displacement of said auxiliary piston to jam said elements between said bearing surface and said inner surface of the cylinder.

3. A device as claimed in claim 1 wherein said auxiliary piston is located axially within said first piston, said auxiliary piston includes two axially adjacent cylindrical parts defining a radial shoulder, and permanently open orifice means communicates the pressure prevailing in said expansion chamber to said shoulder.

4. A device as claimed in claim 1 wherein said auxiliary piston is annular and located at the periphery of said first piston, and permanently open orifice means communicates the pressure prevailing in said expansion chamber to said auxiliary piston.

5. A device as claimed in claim 1 wherein said frangible element is an integral part of said auxiliary piston, and said auxiliary piston is divided into two portions when said part fractures, with one of said portions being movable to actuate said piston stopping means.

6. A device as claimed in claim 1 wherein said frangible element is separate from said auxiliary piston, and the whole of said auxiliary piston displaces upon fracture of said element to actuate said piston stopping means.

7. A device as claimed in claim 1 wherein said means for supplying gas to said expansion chamber comprises an annular pyrotechnic charge located inside said casing, and means for igniting said charge.

8. A device as claimed in claim 7 wherein said pyrotechnic charge has a surface area of combustion which increases during combustion of said charge.

9. A device as claimed in claim 8 wherein said igniting means comprises a gas-free powder.

10. A device as claimed in claim 1 wherein said cylinder is constituted by an outer piston which is axially movable within said casing, the outer surface of said outer piston partially defines a first damping chamber, and said outer piston has means for preventing movement of said outer piston relative to said casing in one axial direction of movement of said outer piston relative to the casing, which said direction corresponds to return movement of said outer piston to an initial position relative to said casing.

* * * * *